United States Patent
Hosaki et al.

(12) 
(10) Patent No.: US 6,327,089 B1
(45) Date of Patent: Dec. 4, 2001

(54) LAMINATED TRANSPARENT STRUCTURE FOR REFLECTIVE DISPLAY

(75) Inventors: Kenji Hosaki; Yoshihiro Kumagai, both of Yokohama; Motoh Asakura, Mie; Shinji Nishikawa, Mie; Kazuya Kobayashi, Mie, all of (JP)

(73) Assignees: Central Glass Company, Limited, Ube; Nippon Mitsubishi Oil Corporation, Tokyo, both of (JP)

( * ) Notice: Subject to any disclaimer, the term of this patent is extended or adjusted under 35 U.S.C. 154(b) by 0 days.

(21) Appl. No.: 09/405,179

(22) Filed: Sep. 24, 1999

(30) Foreign Application Priority Data

Sep. 30, 1998 (JP) ................................. 10-278572

(51) Int. Cl.[7] ................................................. G02B 27/10
(52) U.S. Cl. ........................... 359/618; 428/37; 428/484; 324/244.1; 359/281
(58) Field of Search ..................... 359/281, 484, 359/618, 256, 324, 583; 324/244.1; 428/437

(56) References Cited

U.S. PATENT DOCUMENTS

| | | | |
|---|---|---|---|
| 4,749,261 | * | 6/1988 | McLaughlin et al. ........... 350/339 R |
| 4,973,132 | * | 11/1990 | McDonald et al. ................. 350/174 |
| 6,042,947 | * | 3/2000 | Asakura et al. ..................... 428/437 |

FOREIGN PATENT DOCUMENTS

| | | |
|---|---|---|
| 2-141720 | 5/1990 | (JP) . |
| 5-279090 | 10/1993 | (JP) . |
| 6-40271 | 2/1994 | (JP) . |
| 8-259280 | 10/1996 | (JP) . |
| 02000085057A | * 9/1998 | (JP) . |

OTHER PUBLICATIONS

English translation of Japanese Industrial Standard No. R3211, "Safety Glass for Road Vehicles" (1992).
English translation of Japanese Industrial Standard No. R3212, "Test Method of Safety Glass for Road Vehicles" (1992).
Japanese Industrial Standard No. K7103. (1992).

* cited by examiner

Primary Examiner—Georgia Epps
Assistant Examiner—Timothy J Thompson
(74) Attorney, Agent, or Firm—Crowell & Moring LLP

(57) ABSTRACT

A laminated transparent structure for a reflective display which is used, for example, as a head-up display of an automotive vehicle. The laminated transparent structure comprises a glass plate. A transparent layer is bonded to the glass plate. An optical rotation film is disposed between the glass plate and the transparent layer. Additionally, a hot-melt adhesive is disposed between the optical rotation film and the glass plate to bond the optical rotation film to the glass plate.

16 Claims, 2 Drawing Sheets

LAMINATED TRANSPARENT STRUCTURE FOR REFLECTIVE DISPLAY

BACKGROUND OF THE INVENTION

1. Field of the Invention

This invention relates to improvements in a laminated transparent structure including an optical rotation film, and more particularly to such a laminated transparent structure to be used in a head-up display which is configured, for example, such that a driver of an automotive vehicle can observe an image of driving information projected as displaying light on a windshield glass in a manner that the vehicular information is superimposed on the frontal view.

2. Description of the Prior Art

A variety of laminated transparent structures have been hitherto proposed and put into practical use for a head-up display of an automotive vehicle. The laminated transparent structures include those of the type having a reflection film and those having an optically functional film. These laminated transparent structures are configured by directly applying the reflection film on a windshield glass, or by interposing the optically functional film between two glass plates as disclosed in Japanese Patent Provisional Publication No. 2-141720. Another laminated transparent structure has been disclosed in Japanese Patent Provisional Publication No. 5-279090 and Japanese Patent Provisional Publication No. 6-40271 (Japanese Patent Application No. 4-196841).

However, such conventional laminated transparent structures for the head-up display are or may be insufficient in impact resistance and penetration resistance. In view of this, a laminated transparent structure (including the optically functional film) improved in impact resistance and penetration resistance has been proposed as disclosed in Japanese Patent Provisional Publication No. 8-259280 (Japanese Patent Application No. 7-69506). However, this laminated transparent structure has such a tendency that the peripheral section of the optically functional film peels off or deforms owing to deterioration of adhesive (for the film) with age.

Thus, the above-discussed conventional laminated structures cannot meet the requirements of the impact and penetration resistance according to safety regulations such as JIS (Japanese Industrial Standard) No. R3211 (Automotive Vehicle Safety Glass) and R3212 (Automotive Vehicle Safety Glass Testing Method), and insufficient in durability throughout a long time use.

SUMMARY OF THE INVENTION

It is an object of the present invention to provide an improved laminated transparent structure for a reflective display, which can overcome the drawbacks encountered in conventional laminated transparent structures for a reflective display.

Another object of the present invention is to provide an improved laminated transparent structure for a reflective display, which is sufficiently high in impact resistance and penetration resistance so as to be safe upon being used as a windshield glass of an automotive vehicle.

A further object of the present invention is to provide an improved laminated transparent structure for a reflective display, which includes an optical rotation film and is high in adhesiveness of the optical rotation film to a glass plate while maintaining a high light resistance of a part (corresponding to the optical rotation film) of the laminated transparent structure so that the part is high in transparency.

A first aspect of the present invention resides in a laminated transparent structure for a reflective display, comprising a glass plate. A transparent layer is bonded to the glass plate. An optical rotation film is bonded to the glass plate with a hot-melt adhesive. The transparent layer may be a glass plate so that the laminated transparent structure takes the structure of a laminated glass. Otherwise, the transparent layer may be a transparent plastic layer so that the laminated transparent structure takes a bi-layer structure. The hot-melt adhesive may contain ultraviolet ray absorbing agent and/or light stabilizer.

A second aspect of the present invention resides a laminated transparent structure for a reflective display, comprising a glass plate. A transparent layer is bonded to the glass plate. An optical rotation film is disposed between the glass plate and the transparent layer. Additionally, a hot-melt adhesive is disposed between the optical rotation film and the glass plate to bond the optical rotation film to the glass plate.

A third aspect of the present invention resides in a laminated glass for a reflective display, comprising a first glass plate. A second glass plate is provided. An intermediate film is disposed between the first and second glass plates to bond the first and second glass plates. An optical rotation is film disposed between the first and second glass plates. The optical rotation film is embedded in the intermediate film and located separate from the first glass plate. Additionally, a hot-melt adhesive is disposed between the optical rotation film and the second glass plate to bond the optical rotation film to the second glass plate.

A fourth aspect of the present invention resides in a bi-layer glass for a reflective display, comprising a glass plate. A transparent resin layer is provided. An intermediate film is disposed between the glass plate and the resin layer to bond the glass plate and the resin layer. An optical rotation film is disposed between the glass plate and resin layer. The optical rotation film is embedded in the intermediate film and located separate from the resin layer. Additionally, a hot-melt adhesive is disposed between the optical rotation film and the glass plate to bond the optical rotation film to the glass plate.

A fifth aspect of the present invention resides in a reflective display system, comprising a reflective display. The reflective display includes a glass plate. A transparent layer is bonded to the glass plate. The transparent layer is located on a side where a person resides, relative to the glass plate. An optical rotation film is disposed between the glass plate and the transparent layer. A hot-melt adhesive is disposed between the optical rotation film and the glass plate to bond the optical rotation film to the glass plate. Additionally, a light treating device is provided to cause light to be incident in a polarized state on the transparent layer, the light forming an image to be observed by the person.

According to the present invention, the laminated transparent structure (such as the laminated glass) is sufficiently high in impact resistance and penetration resistance so as to meet the requirements according to safe regulations such as JIS (Japanese Industrial Standard) Nos. R3211 and R3212. Therefore, the laminated transparent structure can be suitably used as a front windshield glass of an automotive vehicle, constituting a head-up display for an image of light representative of information such as driving information. In such a head-up display, double image can be effectively prevented from being formed under the action of the optical rotation film, so that the image of the information can be clearly observed on the windshield glass by a person (driver) in a passenger compartment. Additionally, by virtue of the hot-melt adhesive, the peripheral section of the optical rotation film can be prevented from peeling off from the glass plate, while deformation of see-through image in the windshield glass can be prevented. Furthermore, adding ultraviolet ray absorbing agent and/or light stabilizer to the hot-melt adhesive makes it possible to highly improve the light resistance, maintaining a good transparency of a part (corresponding to the optical rotation film) of the head-up display.

BRIEF DESCRIPTION OF THE DRAWINGS

In the drawings, like reference numerals designate like elements and parts throughout all figures, in which.

DETAILED DESCRIPTION OF THE INVENTION

Figure 1:
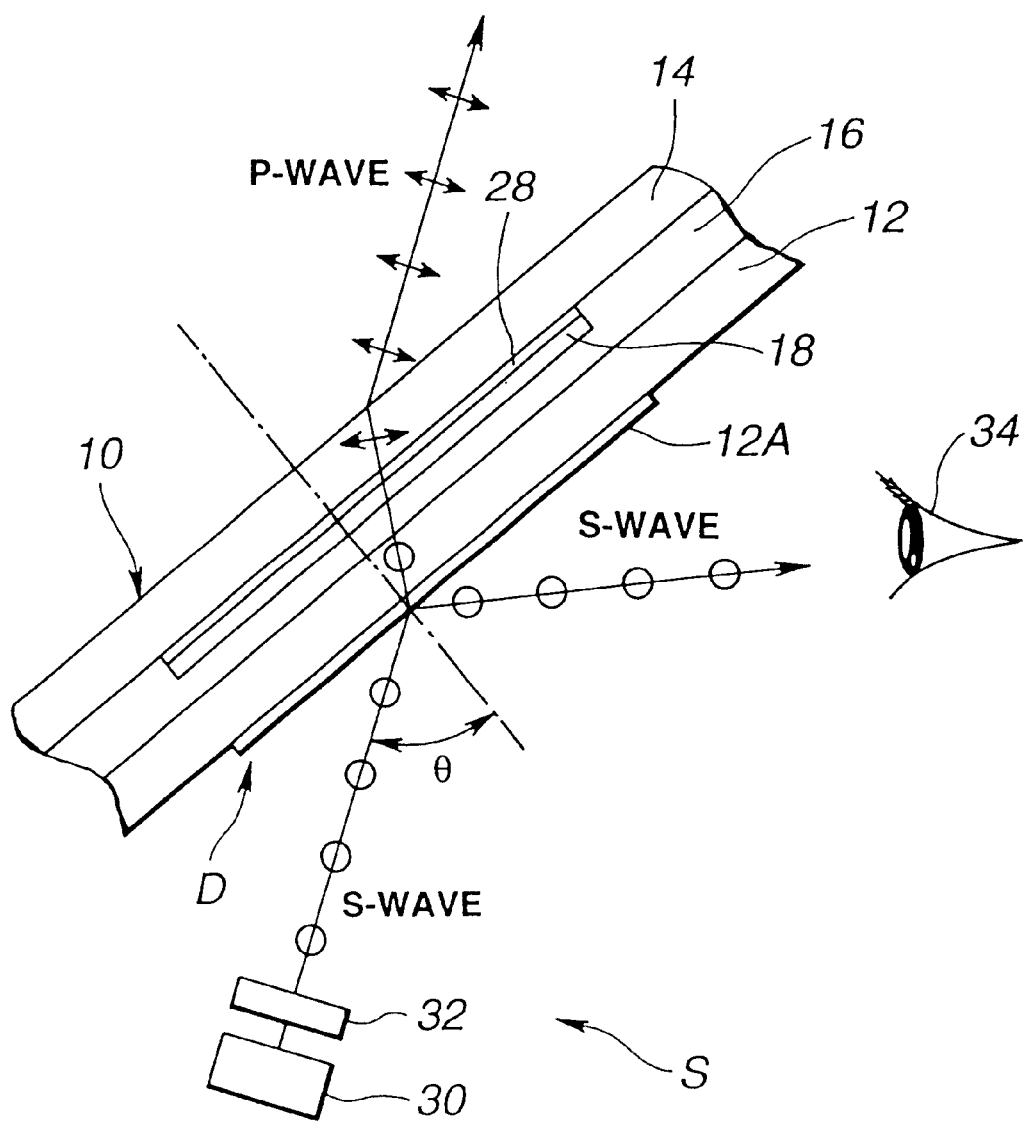
FIG. 1 is a schematic illustration of an embodiment of a laminated transparent structure according to the present invention, including a fragmentary sectional view of a laminated glass constituting a head-up display.

According to the present invention, a laminated transparent structure for a reflective display, comprises a glass plate. A transparent layer is bonded to the glass plate. An optical rotation film is bonded to the glass plate with a hot-melt adhesive.

The optical rotation film functions to make optical rotation and includes a liquid crystal polymer which is in twisted nematic orientation under a liquid crystal condition and is in a glassy state at a temperature lower than liquid crystal transition point thereof. The optical rotation film is produced as follows: The liquid crystal polymer is coated on a transparent substrate such as a plastic film formed of, for example, polyethylene terephthalate (PET). Then, a shearing force is applied to the liquid crystal polymer, and thereafter the liquid crystal polymer is subjected to heat-treatment and then cooling so that a liquid crystal orientation is fixed. In case that the liquid crystal polymer is one whose liquid crystal orientation can be fixed in the glassy state at the temperature lower than the liquid crystal transition point, fixing the liquid crystal orientation can be accomplished by forming the liquid crystal orientation of the liquid crystal polymer, and thereafter by cooling the liquid crystal polymer at the temperature lower than the liquid crystal transition point.

The optical rotation film may be formed of a liquid crystal material which is obtained by fixing a twisted nematic orientation made under a liquid crystal condition, by accomplishing photo cross-linking and thermal cross-linking. Specifically, in this case, fixing the orientation is accomplished by making the nematic orientation of the liquid crystal material, and thereafter by making photo cross-linking or thermal cross-linking of the liquid crystal material. Otherwise, the optical rotation film may be a transparent film having a birefringence, or a $\lambda/2$ plate. Of the various optical rotation films, the optical rotation film formed of the above liquid crystal polymer or liquid crystal material is preferable because it can prevents double image from being formed on the reflective display throughout whole visible range.

The liquid crystal polymer or material is not limited to particular ones of them which are in twisted nematic orientation under a liquid crystal condition and whose orientation is fixed. Accordingly, examples of the liquid crystal polymer whose twisted nematic orientation is fixed in the glassy state are main-chain type liquid crystal polymers such as optically active polyester, polyamide, polycarbonate, and polyesterimide, and side-chain type liquid crystal polymers such as optically active polyacrylate, polymalonate, and polysiloxane. Additionally, the examples include liquid crystal polymer compositions which are prepared by adding other low-molecular weight or high-molecular weight optically active compounds to the above main-chain type or side-chain type polymers which are not optically active.

Examples of the liquid crystal material whose nematic orientation is fixed under photo cross-linking or thermal cross-linking are optically active liquid crystal compounds which have cross-linking functional groups, or liquid crystal compositions to which other compounds having cross-linking functional groups are added. Examples of the cross-linking functional groups are acryl group, methacryl group, vinyl group, allyl group and phthalimide group.

The hot-melt adhesive contains a thermoplastic resin as a main ingredient, and is normally solid but molten upon heating. Examples of the thermoplastic resin are colorless and transparent polyvinyl acetal resin, polyethylenevinyl acetate resin, and polyvinyl butyral resin. The hot-melt adhesive usually may contain stickiness providing resin, wax, plasticizer, filler, and the like. It is preferable that the hot-melt adhesive contains ultraviolet ray absorbing agent such as benzotriazole and/or light stabilizer such as hindered amine.

The hot-melt adhesive is in the form of a film which preferably has a thickness ranging from 1 to 50 $\mu$m. If the thickness is lower than 1 $\mu$m, the hot-melt adhesive is insufficient in mechanical strength. If the thickness exceeds 50 $\mu$m, deformation is appeared at the peripheral section of the optical rotation film when viewed through the optical rotation film, and additionally the optical rotation film is increased in degree of coloring so that its commercial value is lowered. It is more preferable that the thickness of the hot-melt adhesive is within a range of from 5 to 25 $\mu$m. The hot-melt adhesive in the form of the film is disposed between the glass plate and the optical rotation film so as to bond the optical rotation film to the glass plate. The hot-melt adhesive in its molten state may be applied to the optical rotation film by a knife coating using a doctor blade, roll coating, or extrusion coating. It will be understood that methods of applying the hot-melt adhesive are suitably selectable according to the character and dimension of the optical rotation film and their applying ability for the hot-melt adhesive.

The glass plate and the transparent layer constitute a laminate structure. In case of an automotive vehicle, the transparent layer is usually another glass plate, constituting a laminated glass. In other cases, the transparent layer is a transparent plastic layer, thereby constituting a bi-layer structure.

In the laminated glass, an intermediate film is disposed between the two glass plates to bond the two glass plates with each other. The intermediate film is formed of polyvinyl butyral resin which is preferable from the view points of securing safety characteristics of automotive vehicle glass such as impact resistance and penetration resistance due to its adhesiveness to the glass plate, physical strength and the like. It will be understood that the intermediate film may be formed of other resins which are transparent and have a good adhesiveness to the glass plate, for example, polyethylenevinyl acetate resin.

In case of the laminated glass, the optical rotation film is bonded to the inboard surface of the outboard-side glass plate or to the outboard surface of the inboard-side glass plate. It will be understood that the inboard surface of the inboard-side glass plate defines a passenger compartment of the automotive vehicle though not shown. The former case of bonding the optical rotation film to the inboard surface of the outboard-side glass plate is advantageous from the view point of ensuring safety of the vehicular glass, while the latter case of bonding the optical rotation film to the outboard surface of the inboard-side glass plate is advantageous from the view point of ensuring a good weatherability owing to the ultraviolet ray absorbing effect of a ultraviolet ray absorbing agent which has been previous contained in polyvinyl butyral resin serving as the intermediate film. Thus, the surfaces (of the inboard-side or outboard-side glass plate) to which the optical rotation film is to be bonded are selectable according to the material characteristics, weatherability and expected effects.

In case of the bi-layer structure, the transparent plastic layer is formed of polyethylene terephthalate (PET) and bonded to the single glass plate with polyvinyl butyral resin. Otherwise, the transparent plastic layer may be formed of polyurethane resin or the like and laminated on the single glass plate. It will be understood that the bi-layer structure may be formed of a variety of combinations including the glass plate and the transparent plastic layer.

While the laminated transparent structure according to the present invention has been and will be discussed to be used as a windshield glass of an automotive vehicle, it will be appreciated that the laminated transparent structure according to the present invention is excellent in impact resistance and penetration resistance and therefore may be used as a windshield glass of other vehicles such as ships, airplanes and tramcars.

Additionally, although the laminated transparent structure according to the present invention will be shown and described as being able to be suitably used for a head-up display, it will be understood that the laminated transparent structure may be used as an architectural glass and for a variety of reflective displays of display systems which are configured to reflect display information on the surface of the laminated transparent structure.

Examples for embodying the present invention will be discussed hereinafter with reference to FIGS. 1 to 3. The following examples are included merely to aid the understanding of the invention, and variations may be made by one skilled in the art without departing the spirit and scope of the invention.

EXAMPLE 1

In this example, as shown in FIG. 1, the laminated transparent structure was a laminated glass 10 which was to be used as a front windshield glass of an automotive vehicle (not shown) and to constitute a head-up display D of a head-up display system S. The laminated glass comprised an inboard-side glass plate 12 which was located to define a passenger compartment of the automotive vehicle. A driver or/and a passenger was to reside in the passenger compartment. A light-transmittable reflection film 12A had been previously formed on the inboard surface of the inboard-side glass plate 12 by so-called sol-gel process in such a manner as to be located at a position corresponding to the head-up display D. The light-transmittable reflection film 12A might be formed by other processes such as a physical film-forming process, or might be omitted in case that the brightness of a displayed image on the head-up display D is sufficiently high to be observed.

Figure 3:
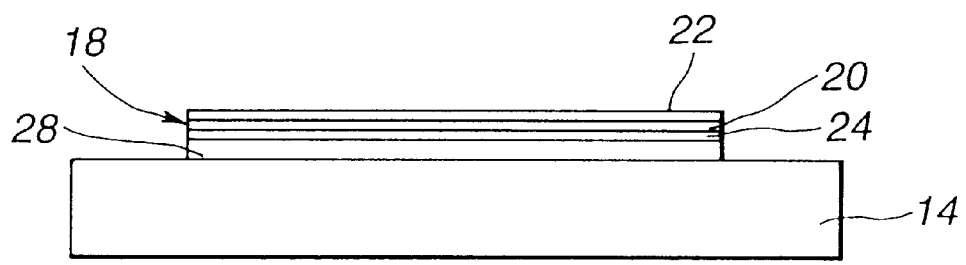
FIG. 3 is a fragmentary sectional view of an optical laminated film bonded on a glass plate, forming part of the laminated transparent structure of FIG. 1 or 2.

As shown in FIG. 3, an optical laminated film 18 included an optical rotation or polarization-direction changing film 20 having a thickness of 5 μm and functions to rotate a plane of polarization of light to be incident thereon. In other words, the optical rotation film 20 functioning to change or adjust the direction of polarization of light to be incident thereon. The optical rotation film 20 in this example included a liquid crystal polymer which was in twisted nematic orientation under a liquid crystal condition and is in a glassy state at a temperature lower than liquid crystal transition point thereof.

The optical laminated film 18 was formed as follows: The liquid crystal polymer was coated on a transparent substrate such as a plastic film formed of, for example, polyethylene terephthalate (PET). Then, a shearing force was applied to the liquid crystal polymer, and thereafter the liquid crystal polymer was subjected to heat-treatment and then cooling so that a liquid crystal orientation was fixed. A barrier layer 22 formed of acrylic resin and having a thickness of 5 μm and a protective layer 24 formed of acrylic resin and having a thickness of 5 μm were disposed on the opposite sides of the optical rotation film 20 in a manner to be in contact with the optical rotation film 20. The barrier layer 22 serves to prevent plasticizer in an intermediate film 16 from moving into the optical rotation film 20.

The thus formed optical laminated film 18 was coated with a paste 28 of the hot-melt adhesive by using a coating device (with a comma head) for knife coating in such a manner that the paste 28 was in contact with the protective layer 24. The paste 28 had been previously prepared by mixing and dissolving ultraviolet ray absorbing agent of benzotriazole in polyvinyl acetal resin (trade name "S-LEC KX") produced by Sekisui Chemical Co., Ltd. The thus coated paste 28 was dried to have a thickness of about 15 μm.

Thereafter, the optical laminated film 18 with the coated paste 28 was punched to obtain a piece having a predetermined shape and predetermined dimensions. The punched piece of the optical laminated film with the coated paste 28 was brought into press contact with the inboard surface of an outboard-side glass plate 14 in such a manner that the paste 28 was in contact with the outboard-side glass plate 1. The outboard-side glass plate 14 was to be located opposite to the inboard-side glass plate 12 and located to contact with ambient air.

Then, the outboard-side glass plate 14 provided with the optical laminated film 18 was laminated to the inboard-side glass plate 12 in such a manner that the intermediate film 16 is put between the inboard-side and outboard-side glass plates 12, 14 to bond the glass plates 12, 14, thus forming a laminated structure. The intermediate film 16 was formed of, for example, polyvinyl butyral. Accordingly, the intermediate film 16 is in contact with the outboard surface of the inboard-side glass plate 12 and with the inboard surface of the outboard-side glass plate 14. The optical laminated film 18 was located between the glass plates 12, 14 in a manner to be embedded in the intermediate film 16. It is to be noted that the optical laminated film 18 is separate from the outboard surface of the inboard-side glass plate 12. Then, the thus formed laminated structure was subjected to an autoclave treatment, thereby obtaining the laminated glass 10 of this example as shown in FIG. 1.

The laminated glass 10 obtained as discussed above was subjected to an impact resistance test and a penetration resistance test which are according to JIS (Japanese Industrial Standard) Nos. R3211 (Automotive Safety Glass) and R3212 (Test Method for Automotive Safety Glass), and to a light resistance test using a sunshine weatherometer.

The impact resistance test is intended to examine as to whether or not the laminated glass 10 had at least a necessary lower limit (or sufficient) stickiness or strength against a small hard flying matter. The penetration resistance test was conducted as follows: A specimen was prepared by being cut out from the laminated glass produced in the manner mentioned above or from an actual product of the laminated glass. The specimen was located on a support frame in such a manner that the inboard-side glass plate was positioned at the upper-side to be exposed. Then, a steel ball was naturally dropped onto the upper surface of the inboard-side glass plate from a position at a predetermined height over the surface of the inboard-side glass plate.

As a result of this impact resistance test, it was confirmed that the laminated glass according to the present invention sufficiently met the requirements of JIS. This was supposed to be resulted from the following fact: In general, the interface between the glass plate and the intermediate film formed of polyvinyl butyral was very high in adhesive (bonding) strength, so that the interface between the outboard-side plate glass and the optical rotation film (with adhesive) was unavoidably relatively low in adhesive strength. According to a preferable mode of the laminated glass of the present invention, by virtue of the fact that the optical rotation film was bonded to the outboard-side glass plate, the outboard-side glass at a portion corresponding to the optical rotation film is broken and peeled off when an impact was applied to the laminated glass; however, the inboard-side glass plate was not peeled off even upon being broken since it was rigidly adhered to the intermediate film, so that the broken pieces of the inboard-side glass plate was prevented from dropping to the side of the passenger compartment. In contrast, in case that the optical rotation film was adhered to the outboard surface of the inboard-side glass plate, the outboard-side glass plate at a portion corresponding to the optical rotation film was hardly peeled off from the intermediate film even upon being broken when an impact was applied to the laminated glass; however, the inboard-side glass plate at a portion corresponding to the optical rotation film was not only broken but also peeled off and dropped to the side of the passenger compartment since the adhesive force between the optical rotation film and the inboard-side glass plate was relatively low.

The penetration resistance test was intended to examine as to whether or not the laminated glass 10 has at least a necessary lower limit (or sufficient) penetration resistance against a small hard flying matter. The penetration resistance test was conducted as follows: The specimen prepared in the same manner as that in the above-mentioned impact resistance test. The specimen was put on the support frame as same as in the above-mentioned impact resistance test. Then, the small steel ball was naturally dropped onto the inboard-side glass from the position at the predetermined height over the surface of the inboard-side glass, in the same manner as that in the above-mentioned impact test. As a result of this penetration resistance test, it was confirmed that the small steel ball could not penetrate the laminated glass according to the present invention, and therefore the laminated glass could meet the requirements of JIS. Additionally, the same impact resistance test was conducted on a specimen which is similar to the above-mentioned specimen (the laminated glass of the present invention) with the exception that another optical rotation film such as a $\lambda/2$ plate was used. This test also demonstrated that the small steel ball could not penetrate the laminated glass using the $\lambda/2$ plate as the optical rotation film, so that such a laminated glass could meet the requirements of JIS.

The light resistance test was intended to examine as to whether or not the laminated glass 10 of this example had a sufficient light resistance. The light resistance test was conducted as follows: The specimen was prepared in the same manner as that in the above-mentioned impact resistance test. Using a sunshine weatherometer, the specimen was subjected to light (sunshine) for a long time, in which a yellow degree YI of the specimen (at a part corresponding to the head-up display D) was measured at a first time before the test and at a second time after the lapse of 500 hours in the test of the sunshine weatherometer, according to JIS No. K7103. The yellow degree YI was represented by an equation $[YI=100 (1.28X-1.06Z)/Y]$ where X, Y and Z were three stimulus values of the specimen under a standard light C in the sunshine weatherometer. As a result, the measured yellow degree of the laminated glass 10 of this example (including the hot-melt adhesive 28 for bonding the optical laminated film 18 to the outboard-side glass plate 14) was about 8 at the first time and took a hardly changed value (having a variation less than 0.1 relative to about 8) even at the second time upon a long exposure to sunshine, thus exhibiting a good light resistance. For the comparison purpose, the same light resistance test was conducted on a comparative specimen (corresponding to the laminated glass of this example) with the exception that the hot-melt adhesive 28 was replaced with a conventional acrylic resin adhesive which did not contain ultraviolet ray absorbing agent. As a result, the measured yellow degree YI of the comparative specimen (at a part corresponding to the head-up display D) was 8.3 at the first time and became 62.0 at the second time. Thus, the comparative specimen was largely yellowed under the action of light, exhibiting a low light resistance.

Next, the head-up display system S including the laminated glass 10 of this example will be discussed.

The laminated glass 10 of this example was installed to an automotive vehicle body to be used as the front windshield glass. The head-up display system S included a displaying device 30 such as a C.R.T., a fluorescent display tube, a liquid crystal display or the like. The displaying device 30 generated a display light such as driving information of the like, and is arranged such that the display light was incident at Brewster's angle ($\theta=56.3°$) on the laminated glass 10. The display light included S-wave and P-wave and was incident to a S-wave polarizing device 32, so that the display light from the displaying device 30 was polarized to transmit S-wave. The S-wave was incident on and reflected by the surface (the interface between air and the light-transmittable film 12A) of the light-transmittable film 12A formed on the inboard-side glass plate 12, and reached eyes 34 of a driver, so that the driver could observe the driving information or the like on the front windshield glass. As appreciated, a part of S-wave incident on the laminated glass 10 entered the inboard-side glass plate 12 and reached the optical rotation film 20 through the intermediate film 16, so that S-wave was rotated into P-wave. As a result, the S-wave was hardly reflected at the interface between the outboard surface of the outboard-side glass plate 14, and therefore the almost whole P-wave could outgo from the outboard-side glass plate 14. Accordingly, the driver could clearly observe the displayed image of the driving information or the like while preventing double image from being formed on the laminated glass 10.

EXAMPLE 2

Figure 2:
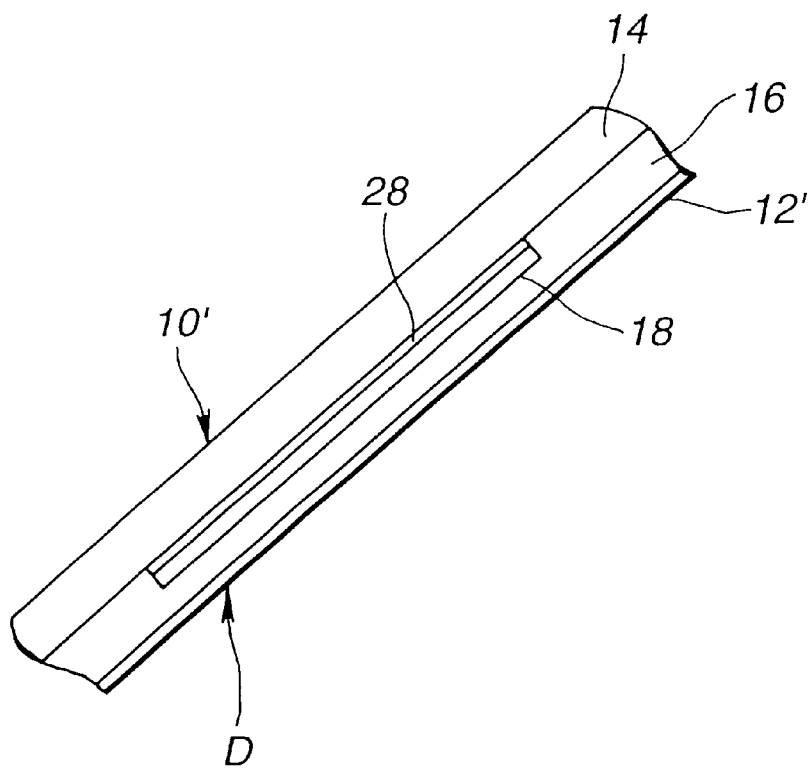
FIG. 2 is a schematic illustration of another embodiment of the laminated transparent structure according to the present invention, including a fragmentary sectional view of a bi-layer glass constituting a head-up display.

In this example, as shown in FIG. 2, the laminated transparent structure was a bi-layer glass 10' which was similar to the laminated glass 10 of Example 1 with the exception that the inboard-side glass plate 12 was replaced with a polyethylene terephthalate film 12' whose inboard surface was treated to be provided with a hard coating. This b-layer glass 10' was to be used as a front windshield glass of an automotive vehicle and constituted the head-up display D of the head-up display system S. The optical laminated film 18 as shown in FIG. 3 was bonded to the outboard-side glass plate 14 with the hot-melt adhesive 28 so as to be separate from the polyethylene terephthalate film 12', similarly to in Example 1.

This bi-layer glass 10' was subjected to the impact resistance test and the penetration resistance test, and the light resistance test, similarly to in Example 1. As a result, it was confirmed that the bi-layer glass 10' was sufficiently high in impact resistance and penetration resistance to meet the requirements of JIS and high in light resistance.

In addition to the above-discussed effects in impact resistance, penetration resistance and light resistance, the examples of laminated transparent structure (glass) according to the present invention offer the following effects: Assume that the optical rotation film is bonded to the glass plate with a conventional adhesive. A bonding operation for the optical rotation film can be readily made; however, defect in appearance may arise after laminating operation for the laminated transparent structure owing to deterioration with age, in which a part of the peripheral section of the optical rotation film peels off from the glass plate, or the whole peripheral section (having a width of about 1 mm) of the optical rotation film peels off from the glass plate in the worst case. Although causes for such peeling of the optical rotation film have been unclear, it is assumed that one of the causes is the fact that stress remains at the peripheral section of the optical rotation film even after the laminating operation. However, regarding the present invention, it is supposed that, by virtue of using the hot-melt adhesive having physical properties similar to those of the intermediate film and a high transparency, stress can be prevented from generating among the materials constituting the laminated transparent structure even after the laminating operation, thereby providing the effect of preventing the peeling of the optical rotation film. As a matter of fact, such a defect as the peeling of the optical rotation film cannot arise if the optical rotation film is bonded to a glass substrate with the hot-melt adhesive.

Furthermore, if the optical rotation film is disposed on the inboard side of the intermediate film formed of polyvinyl butyral or the like, the intermediate film absorbs ultraviolet ray, and therefore the light resistance of the optical rotation film is hardly affected upon exposure to sunlight. However, in case that the optical rotation film is disposed on the outboard side of the intermediate film, the light resistance of the optical rotation film may be affected by sunlight. In this regard, the holt-melt adhesive preferably contain the ultraviolet ray absorbing agent and/or light stabilizer thereby reducing baneful influence of sunlight to the light resistance of the laminated glass.

What is claimed is:

1. A laminated transparent structure for a head-up display comprising:
    a glass plate;
    a transparent layer bonded to said glass plate;
    an optical rotation film; and
    a hot-melt adhesive for bonding said optical rotation film to said glass plate, wherein said hot-melt adhesive has a thickness ranging from 1 to 50 $\mu$m.

2. A laminated transparent structure for a head-up display comprising:
    a glass plate;
    a transparent layer bonded to said glass plate;
    an optical rotation film disposed between said glass plate and said transparent layer; and
    a hot-melt adhesive disposed between said optical rotation film and said glass plate to bond said optical rotation to said glass plate, wherein said hot-melt adhesive has a thickness ranging from 1 to 50 $\mu$m.

3. A laminated transparent structure as claimed in claim 1, wherein said optical rotation film includes a liquid crystal polymer which is in twisted nematic orientation under a liquid crystal condition and is in a glassy state at a temperature lower than liquid crystal transition point of the high polymer.

4. A laminated transparent structure as claimed in claim 1, wherein said optical rotation film includes a liquid crystal material which is in nematic orientation under a liquid crystal condition, the nematic orientation being fixed under one of photo cross-linking and thermal cross-linking.

5. A laminated transparent structure as claimed in claim 1, wherein said hot-melt adhesive contains a main ingredient formed of at least one resin selected from the group consisting of colorless and transparent polyvinyl acetal resin, polyethylenevinyl acetate resin, and polyvinyl butyral resin.

6. A laminated transparent structure as claimed in claim 1, wherein said hot-melt adhesive contains at least one selected from the group consisting of ultraviolet ray absorbing agent and light stabilizer.

7. A laminated transparent structure for a head-up display, comprising:
    a first glass plate;
    a second glass plate;
    an intermediate film disposed between said first and second glass plates to bond said first and second glass plates;
    an optical rotation film disposed between said first and second glass plates, said optical rotation film being embedded in said intermediate film and located separate from said first glass plate; and
    a hot-melt adhesive disposed between said optical rotation film and said second glass plate to bond said optical rotation film to said second glass plate, wherein said hot-melt adhesive has a thickness ranging from 1 to 50 $\mu$m.

8. A bi-layer glass for a head-up display, comprising:
    a glass plate;
    a transparent resin layer;
    an intermediate film disposed between said glass plate and said resin layer to bond said glass plate and said resin layer;
    an optical rotation film disposed between said glass plate and resin layer, said optical rotation film being embedded in s aid intermediate film and located separate from said resin layer; and
    a hot-melt adhesive disposed between said optical rotation film and said glass plate to bond said optical rotation film to said glass plate, wherein said hot-melt adhesive has a thickness ranging from 1 to 50 $\mu$m.

9. A head-up display system comprising:
    (A) a head-up display a glass plate, a transparent layer bonded to said glass plate, said transparent layer being located on a side where a person resides, relative to said glass plate, an optical rotation film disposed between said glass plate and said transparent layer, and a hot-melt adhesive disposed between said optical rotation film and said glass plate to bond said optical rotation film to said glass plate, wherein said hot-melt adhesive has a thickness ranging from 1 to 50 µm; and (B) a light treating device for causing light to be incident in a polarized state on said transparent layer, the light forming an image to be observed by the person.

10. A laminated transparent structure as claimed in claim 1, wherein said hot-melt adhesive has a thickness ranging from 5 to 25 µm.

11. A laminated transparent structure as claimed in claim 2, wherein said hot-melt adhesive has a thickness ranging from 5 to 25 µm.

12. A laminated transparent structure as claimed in claim 7, wherein said hot-melt adhesive has a thickness ranging from 5 to 25 µm.

13. A bi-layer glass as claimed in claim 8, wherein said hot-melt adhesive has a thickness ranging from 5 to 25 µm.

14. A head-up display system as claimed in claim 9, wherein said hot-melt adhesive has a thickness ranging from 5 to 25 µm.

15. A laminated glass as claimed in claim 7, wherein said intermediate film comprises polyvinyl butyral and said hot-melt adhesive comprises at least one resin selected from the group consisting of polyvinyl acetal resin, polyethylenevinyl acetate resin, and polyvinyl butyral resin.

16. A laminated glass as claimed in claim 8, wherein said intermediate film comprises polyvinyl butyral and said hot-melt adhesive comprises at least one resin selected from the group consisting of polyvinyl acetal resin, polyethylenevinyl acetate resin, and polyvinyl butyral resin.

* * * * *